No. 844,591. PATENTED FEB. 19, 1907.
W. HALKYARD.
GAGE ATTACHMENT FOR MACHINES FOR SETTING LACING HOOKS.
APPLICATION FILED AUG. 22, 1902.
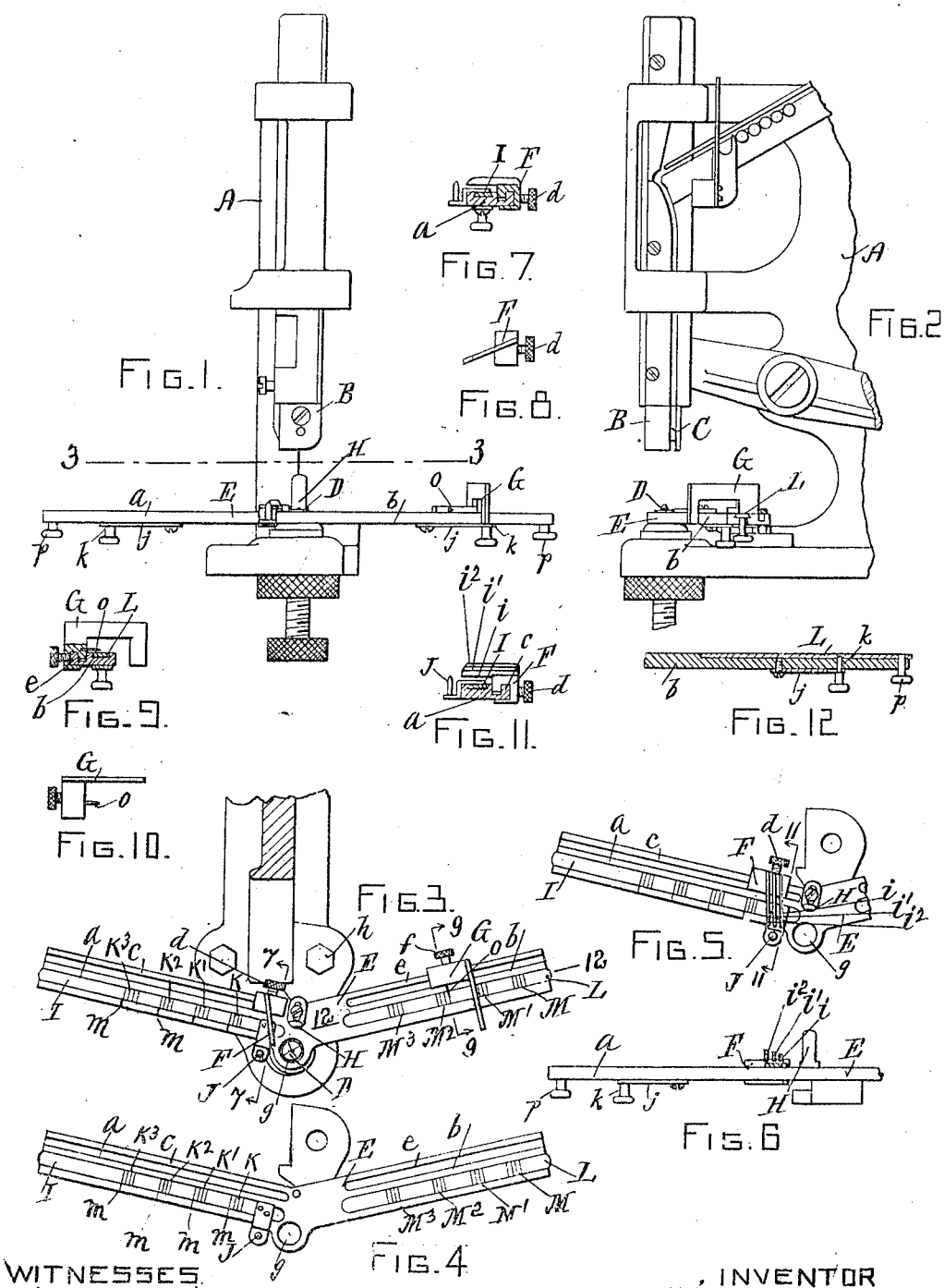
WITNESSES
INVENTOR
William Halkyard
BY J. Scholfield
ATTY

UNITED STATES PATENT OFFICE.

WILLIAM HALKYARD, OF PROVIDENCE, RHODE ISLAND.

GAGE ATTACHMENT FOR MACHINES FOR SETTING LACING-HOOKS.

No. 844,591.　　　　Specification of Letters Patent.　　　　Patented Feb. 19, 1907.

Application filed August 22, 1902. Serial No. 120,703.

*To all whom it may concern:*

Be it known that I, WILLIAM HALKYARD, a citizen of the United States, residing at Providence, in the State of Rhode Island, have invented a new and useful Improvement in Gauge Attachments for Machines for Setting Lacing-Hooks, of which the following is a specification.

The object of my invention is to provide a gauge that may be readily and accurately adjusted to the required position for determining the proper distance from the top of the shoe-quarter for setting the first lacing-hook, which in the right-hand quarter is the hook nearest the top of the shoe and in the left-hand quarter is the hook farthest from the top of the shoe; also, for determining the distance from the meeting edges of said quarters for setting all of said hooks and for determining the distance between the hooks; and my invention consists in the improved construction and arrangement of parts whereby these several objects are accomplished, and a convenient gauge for setting the lacing-hooks is produced, as hereinafter set forth.

In the accompanying drawings, Figure 1 represents a partial front view of a machine for setting lacing-hooks provided with my improved gauge attachment. Fig. 2 represents a partial side view of the same. Fig. 3 represents a horizontal section taken in the line 3 3 of Fig. 1. Fig. 4 represents a top view the angularly-formed gauge-bar removed from the machine. Fig. 5 is a partial top view of the same, showing an improved form of the sliding gauge for determining the distance of the end lacing-hook from the top of the right-hand quarter of the shoe. Fig. 6 represents an edge view of the portion of the gauge-bar shown in Fig. 5. Fig. 7 represents a section taken in the line 7 7 of Fig. 3. Fig. 8 represents a top view of the sliding gauge shown in Fig. 7. Fig. 9 represents a section taken in the line 9 9 of Fig. 3. Fig. 10 represents a top view of the sliding gauge shown in Fig. 9. Fig. 11 represents a section taken in the line 11 11 of Fig. 5. Fig. 12 represents a section taken in the line 12 12 of Fig. 3.

In the drawings, A represents the frame, and B the setting-plunger, of the machine for setting lacing-hooks shown and described in my Letters Patent of the United States, No. 620,844.

C represents the raceway-track, and D the anvil.

The gauge-bar E is preferably formed with the opposite angularly-directed arms $a$ and $b$, upon which are placed the sliding gauges F and G, the gauge F serving to determine the proper distance for setting the lacing-hook, which is nearest the top of the shoe in the right-hand quarter and the gauge G to determine the proper distance for setting the lacing-hook which is farthest from the top of the shoe in the left-hand quarter. The gauge F is arranged to slide upon the rib $c$ of the arm $a$ and is secured in position by means of the screw $d$, and the gauge G is arranged to slide upon the rib $e$ of the arm $b$ and is secured in its position thereon by means of the screw $f$. The angular gauge-bar E is provided with the perforation $g$, which fits over the anvil D and is secured to the base of the frame A by means of the bolt $h$, and upon the gauge-bar E, back of the anvil D, is placed the adjustable gauge H, by means of which the distance from the meeting edges of the shoe-quarters for setting the lacing-hooks will be determined.

A modification of the gauge F is shown in Figs. 5 and 6, in which the gauge is provided with three gauge-faces $i$, $i'$, and $i^2$, and when the said gauge is set in position for use, as shown in Fig. 5, the gauge-face $i$ will be adapted to determine the position of the end lacing-hook when the edge of the quarter has been stitched and turned, the gauge-face $i'$, to determine the said distance in the quarters of little gents', youths', and boys' shoes, before the edges have been stitched and turned and the gauge-face $i^2$ to determine the said distance in the quarters of men's shoes before the edges have been stitched and turned, the said gauge-faces being arranged in steps one higher than the other, as shown in Fig. 6, and by this means I am enabled to set the end lacing-hook in all of these sizes without changing the position of the gauge F on the arm $a$, whereas when the single gauge F (shown in Fig. 3) is employed its position upon the gauge-bar would have to be changed very often to meet the changed condition of the quarters to be operated upon.

The arm $a$ of the gauge-bar E is provided with the graduated slide-bar I, the inner end of which is provided with the upwardly-projecting gauge-pin J, which serves to guide the spacing of the hooks in the quarter from the previously-set hook, the required adjustment of the pin J relatively to the axis of the anvil D upon which the hooks are set being effected by moving the said slide either inwardly or outwardly against the frictional resistance caused by the upward pressing of the spring $j$, transmitted to the under side of the said slide-bar through the stud $k$. The slide-bar I is provided with separate sets of graduations K, K', K², and K³, and the gauge-bar E is provided with the index-marks $m\ m\ m\ m$. The series of graduations K of the guide-bar are adapted for determining the proper position of the pin J, when spacing the lacing-hooks for the four standard men's sizes, the graduations K' for the four standard boys' sizes, the graduations K² for the four standard youths' sizes, and the graduations K³ for the four standard little gent sizes. The arm $b$ of the gauge-bar E is provided with the preferably removable slide-bar L, provided with the graduations M M' M² M³, and the sliding gauge G is provided with the pointer $o$, by means of which the said gauge is to be set in proper position relatively to the said graduations. The set of graduations M, serving to determine the proper position of the gauge G, for men's sizes, those of M' for boys' sizes, those of M² for youths' sizes, and those of M³ for the little gent sizes. The sliding bars I and L are preferably dovetailed into the gauge-bar E at their edges, as shown in Figs. 7 and 11, and are provided with the end knob $p$ for convenient manipulation.

In operating with the machine when the end lacing-hook has been set it is to be placed upon the gauge-pin J, which is located at the proper distance from the anvil for setting the succeeding hook and this hook, when set is to be placed upon the pin J and so on until all the hooks have been set.

I claim as my invention—

1. In a gauge attachment for machines for setting lacing-hooks, the combination of the angular gauge-bar having arms extending upon opposite sides of the anvil, the guiding-ribs upon the upper side of the arms of the said gauge-bar, the index-marks upon the upper surface of one of the said arms, a slide-bar arranged to slide in the upper side of the said arm of the gauge-bar, and having a gauge-pin extending upward at its inner end, friction means for holding the slide-bar in its set position, and the adjustable gauges extending across the upper side of the arms of the gauge-bar.

2. In a gauge attachment for machines for setting lacing-hooks, the combination of a gauge-bar having arms extending upon opposite sides of the anvil, and a graduated slide-bar arranged for sliding engagement with one arm of the gauge-bar, and having a gauge-pin at its inner end, with an adjustable sliding gauge upon the same arm of the gauge-bar, for determining the proper distance for setting the first lacing-hook from the top of the shoe in the right-hand quarter of the shoe-upper, the said gauge having gauge-faces arranged in steps one higher than the other, whereby the end lacing-hook may be set in both the finished and unfinished quarters of the shoe-upper, substantially as described.

WILLIAM HALKYARD.

Witnesses:
SOCRATES SCHOLFIELD,
W. A. CAMPBELL.